United States Patent [19]

Willey

[11] Patent Number: 4,573,646
[45] Date of Patent: Mar. 4, 1986

[54] MODE SELECTION RETRACTOR
[75] Inventor: Ronald A. Willey, Port Huron, Mich.
[73] Assignee: TRW Automotive Products Inc., Cleveland, Ohio
[21] Appl. No.: 602,921
[22] Filed: Apr. 23, 1984
[51] Int. Cl.⁴ .................. A62B 35/02; B65H 75/48
[52] U.S. Cl. .................. 242/107.4 A; 242/107.4 R
[58] Field of Search .............. 242/107.4 C, 107.4 D, 242/107.4 E, 107.4 B, 107.7, 107.4 A, 107.4 R; 280/806; 297/478

[56] References Cited
U.S. PATENT DOCUMENTS

| 3,412,952 | 11/1968 | Wohlert et al. | 242/107.4 |
|---|---|---|---|
| 3,578,260 | 5/1971 | Kell | 242/107.4 A |
| 3,598,336 | 8/1971 | Frost | 242/107.4 D |
| 3,667,698 | 6/1972 | Fisher | 242/107.4 |
| 3,858,826 | 1/1975 | Sprecher | 242/107.7 |
| 3,862,726 | 1/1975 | Ulrich et al. | 242/107.4 D |
| 3,865,392 | 2/1975 | Higbee et al. | 242/107.4 B |
| 3,945,586 | 3/1976 | Higbee et al. | 242/107.4 D |
| 3,960,339 | 6/1976 | Fisher | 242/107.4 R |
| 4,083,512 | 4/1978 | Rumpf | 242/107.4 A |
| 4,327,882 | 5/1982 | Frankila | 242/107.4 A |
| 4,402,473 | 9/1983 | Kubota et al. | 242/107.4 A |
| 4,427,164 | 1/1984 | Rumpf | 242/107.4 R |
| 4,428,545 | 1/1984 | Naitoh | 242/107.4 A |
| 4,436,255 | 3/1984 | Matsui et al. | 242/107.4 A |
| 4,437,623 | 3/1984 | Wyder | 242/107.4 A |

Primary Examiner—Stuart S. Levy
Assistant Examiner—Katherine Jaekel
Attorney, Agent, or Firm—Yount & Tarolli

[57] ABSTRACT

A lock mode selection structure for seat belt retractors having a vehicle sensitive lock mode and an automatic lock mode in which a specific interval of withdrawal activates the automatic lock mode in a pilot pawl lock structure and thereafter the vehicle sensitive lock mode is restored by selected rewind or retraction movement of spool.

7 Claims, 8 Drawing Figures

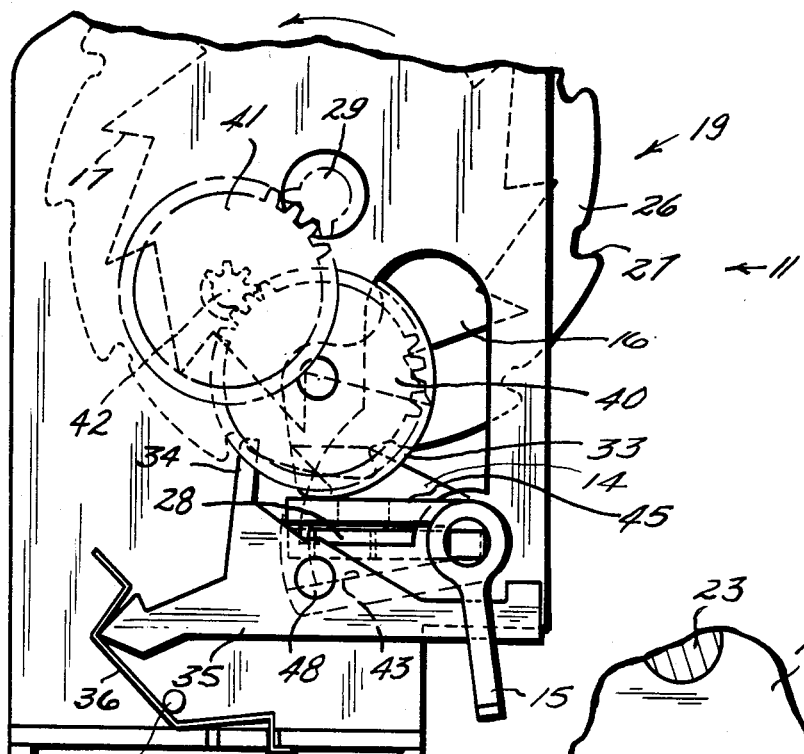
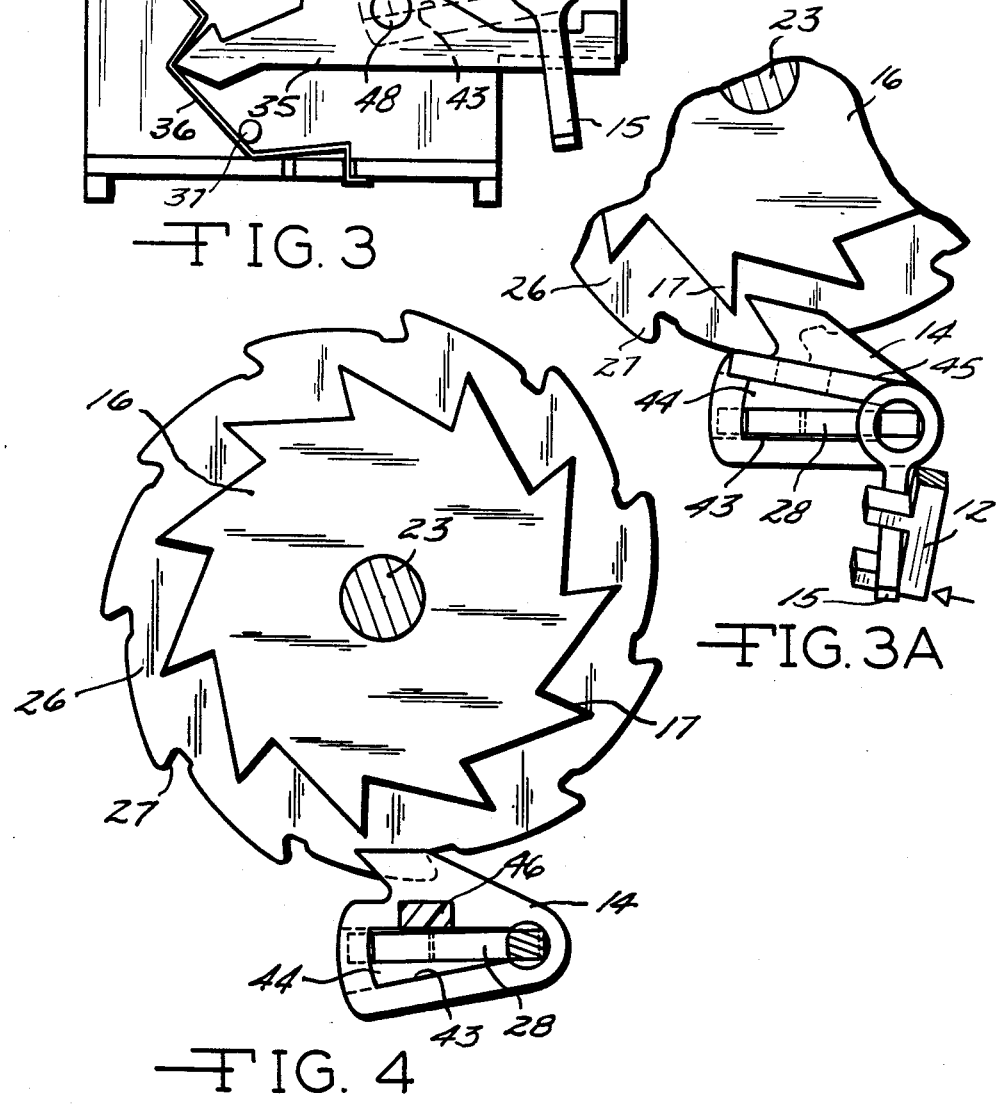

U.S. Patent   Mar. 4, 1986   Sheet 3 of 3   4,573,646
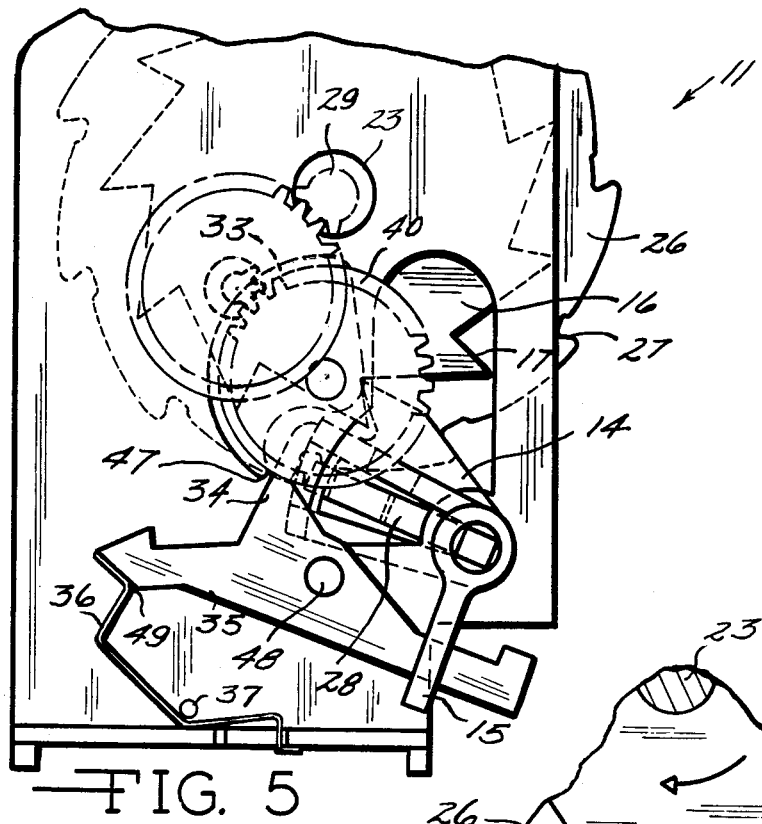
FIG. 5
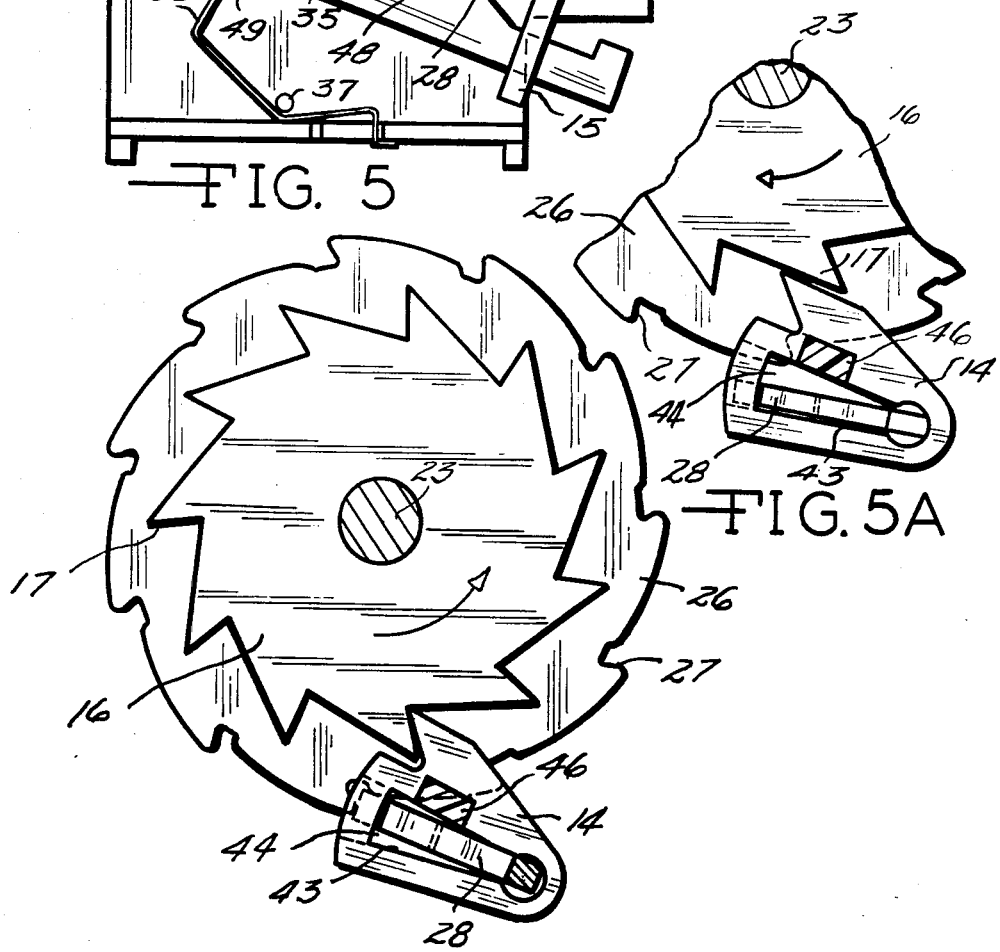
FIG. 5A
FIG. 6

MODE SELECTION RETRACTOR

The present invention is directed to a new and improved seat belt retractor and more specifically to a seat belt retractor which provides a webbing controlled lever movement and piloted selection of locking modes in which a vehicle sensitive retractor is converted to an automatic locking retractor at any selected monitored amount of webbing withdrawal and the selection and monitoring is reversible by manipulation of the lever by a selected and monitored amount of retraction of webbing.

BACKGROUND OF THE INVENTION

Seat belt retractors have been employed in aircraft and automotive safety installations for many years. Originally developed to perform a housekeeping task, the retractors began to perform a myriad of other functional duties beyond simply winding up surplus belting or webbing. The seat belt retractors were adapted to extend needed webbing and then lock at a selected extension or when emergency situations presented themselves. Slight retraction after withdrawal of webbing caused a locking pawl to engage a ratchet carried by the spool of a retractor as by removing a pawl blocking element. Thereafter, the retractor was said to be in an automatic lock mode since the pawl, while allowing retraction of webbing, would not allow further withdrawal until the pawl was physically separated from contact with the ratchet. It was usual to cancel the automatic locking structure by a selected amount of retraction as by a webbing follower or by a rotation sensor or clutch to shift the pawl out-of-engagement with the ratchet against a spring bias urging the pawl toward the ratchet. These devices were known as automatic locking retractors, their pawls engaging the ratchet in the locking mode in the natural course of a user's manipulation of the webbing.

Two structures in the prior art exemplify this automatic locking retractor and these are seen in the U.S. Pat. No. 3,667,698 to Robert C. Fisher and the U.S. Pat. No. 3,412,952 to G. Wohlert.

Another and even older locking type of seat belt retractor is the vehicle sensitive retractor and retractors of this type employ a sensor which relates itself to changes in velocity or acceleration and deceleration of the vehicle in which the retractor is installed. Generally, such devices utilize an inertial function of an element, like a pendulum, roller, weight or pool of electrically conducting fluid to activate either directly or indirectly a pawl which was moved (as a consequence of the inertial displacement) to lock contact with the ratchet of the retractor in prevention of webbing withdrawal. A typical early development is seen in the U.S. Pat. No. 3,960,339 to Robert C. Fisher.

Examples of further developments are seen in the work of retractor devices which provide redundant locking systems or combinations of the automatic locking mode and the vehicle sensitive locking mode in a single retractor structure as, for example, the retractor of Robert J. Rumpf in U.S. Pat. No. 4,083,512.

Recently, the work of T. Kubota, seen in U.S. Pat. No. 4,402,473, of John W. Frankila, et al in U.S. Pat. No. 4,327,882, and of Robert J. Rumpf in the U.S. Pat. No. 4,427,164, show activity looking to the selective and manual overriding of a vehicle sensitive locking system. In such instances, the selection of an automatic locking mode acts substantially directly on the lock pawl element. A similar type of device is seen in the U.S. Pat. No. 4,428,545 to Katsumi Naitoh. A cam functioning mode selecting device is found in the structure described in the patent application of Wallace Carson Higbee, Ser. No. 589,679, filed on Mar. 15, 1984.

The present invention extends and improves these directions to provide a relatively simple piloted pawl means for selection of lock mode and automatic monitored disconnect of that mode to restore a prior mode. The invention includes a self-actuating mode cancellation feature which is independent of selective operation of the means for selection of lock mode and restoration of the retractor to an inertially monitored or vehicle sensitive lock mode following selected retraction movement of the spool of the retractor.

It is the primary object of the present invention to improve on the prior conversion structures by the provision of a pilot pawl system which improves the sensitivity of the locking function in both modes and reduces the strength of the bias required to achieve the threshold of the automatic locking mode and substantially simplifies the construction of the conversion apparatus while providing a conversion available to a wider variety of plural spool constructions than those in which a more or less direct inertial actuation is required for lock or plural spools. Either mode selected causes movement of the pilot pawl and thereafter the principal pawl is driven by the webbing and monitored as it is withdrawn from the spool or as the spool senses the force.

An object of the present invention is to provide a selectively operable lock acting on a spool of webbing in a retractor in elimination of the need for excessive withdrawal of webbing from the spool and to secure infant child carriers, children, cargoes and persons to the vehicle seat in a lock mode which is automatically thereafter engaged to prevent any further webbing withdrawal. The retractor improvement of the present invention does not impede retraction of webbing.

Another object is to provide an improved selectively operable lock means which can be engaged or disengaged without necessity for complete rewind in restoration of a vehicle sensitive (inertial) locking means.

Still another object is to achieve the foregoing objects by use of a piloted pawl structure whereby it is unnecessary to engage the principal pawl directly in achievement of the selection of an automatic locking mode. The pilot pawl is mounted on the principal pawl and the driving of the pilot pawl by the withdrawal of webbing after contact of a pilot ratchet with the pilot pawl drives the principal pawl into force and lock engagement against the principal ratchet. The pilot system, operable in both lock modes, substantially extends the operability and sensitivity of the selection structure.

Another object is to provide a reversible selection means available for remote operation as by toggle-detent selection, hydraulic or pneumatic selection, the same gear-cam means used to cancel the automatic locking mode, and by electromechanical structures as, for example, a reversible solenoid means.

Other objects, including modular construction, low weight, simplicity, economy, amenability to plural and dual spool retractors, will be apparent as the description proceeds.

IN THE DRAWINGS

FIG. 3 is a partially cutaway and enlarged fragment in side elevation of the ratchet structure of the present invention as in FIG. 2 and better indicating the pilot pawl resting on the main pawl and with the mode selecting lever biased away from engagement with the pilot pawl by the gear driven cam and the detent spring.

FIG. 3A is a cutaway somewhat stylized side elevation view fragment indicating the engaging position of the pilot pawl toward the pilot ratchet when urged to this position by action of the vehicle sensitive linkage. Note that the lock pawl awaits being driven to engagement with the principal or lock ratchet on the spool.

FIG. 4 is a side elevation partial view of the retractor of the present invention and indicates the restored unlocked condition where the bias on the lever is away from contacting the pilot pawl against the pilot ratchet and the pilot pawl rests substantially on the main lock pawl.

FIG. 5 is a partial side elevation view of the retractor of the present unit cutaway to indicate the lifting of the principal pawl by the pilot pawl when the lever is in the locking position applying a bias against the pilot pawl to contact against the pilot ratchet and the pilot ratchet rotating with the spool has driven the principal pawl into lock position against the main ratchet of the spool.

FIG. 5A is a fragmental side elevation taken at the pilot pawl at the start of retraction rotation indicating the condition of the pilot pawl as being cammed away from lock engagement against the bias of the lever and indicating that rewind can always occur and that the pilot pawl remains poised to achieve the locking of the spool whenever webbing withdrawal occurs.

FIG. 6 is a side elevation of the spool and showing the principal and pilot ratchets and indicates that the principal pawl has been elevated into locked condition against the main ratchet.

GENERAL DESCRIPTION

Figure 1:
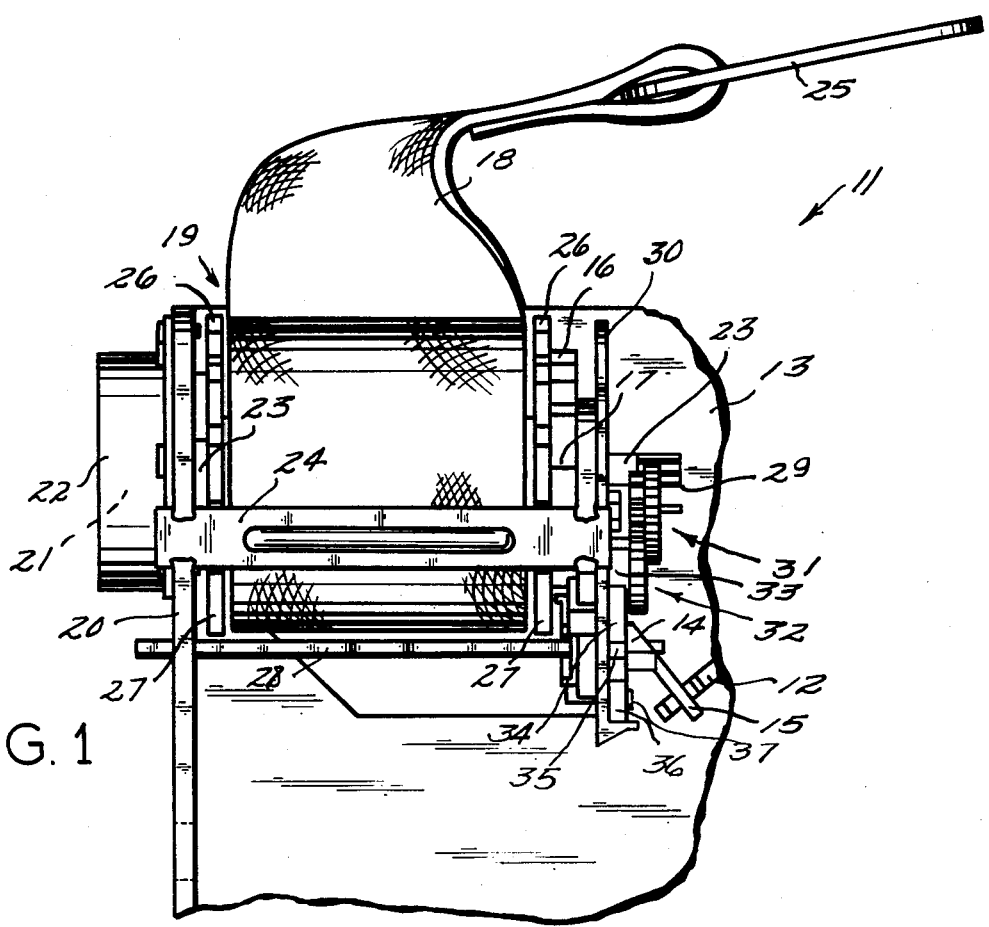
FIG. 1 is a front elevation view of a cutaway retractor tandem frame and indicating a retractor structure in accord with the present invention and best indicating the mode selection structure and the remote means locking the retractor in the vehicle sensitive mode upon inertially sensed displacement carried to the retractor.

The retractor of the present invention is a seat belt retractor of the vehicle sensitive type responding to sensed inertial imbalance in the vehicle in which it is used. The retractor is accordingly able to pay out seat belt webbing from its spool and retract that webbing by means of a rewind motor. This action is smooth and the only time such action is interrupted is when inertial imbalance occurs. Then, the inertial actuator or sensor is displaced and the displacement causes a pilot pawl element to be moved into blocking contact against a pilot ratchet which is coaxially driven by the spool. The pilot ratchet, if under the force of rotation by webbing withdrawal from the spool, then lifts a principal or lock pawl which engages the teeth of a principal or lock ratchet and the retractor is thus locked against withdrawal. However, this does not prevent retraction of the seat belt webbing by the rewind motor. So far, this describes a rather typical vehicle sensitive piloted retractor and the lock mode is achieved by displacement of the inertial actuator. To this construction in this invention has been added a pivotally mounted spring biased lever connected to the frame of the retractor. The spring applies a bias against the lever so that in extremes of lever travel, the bias urges the lever into operative contact with the pilot pawl in one direction of movement and away from contact with the pilot pawl in the other or retracting direction of movement. On engagement of the lever with the pilot pawl, the bias of the spring maintains contact as between the pilot pawl and the pilot ratchet so that any withdrawal thereafter of webbing from the spool tilts the pilot pawl and powers the main pawl into lock engagement with the teeth of the main ratchet thereby locking the retractor. At engagement of pilot pawl against the pilot ratchet, the retractor, originally in the vehicle sensitive lock mode, is converted to an automatic locking mode.

While the pilot pawl is engaged against the pilot ratchet by the biased lever, the lever assures locking contact and the inertial actuator is ineffectual. The function of the vehicle sensitive inertial actuator is restored when the lever is moved to its other extreme position by a rotation sensing means which moves through a selected monitored amount of spool rotation in retraction and which means disengages the lever from the pilot pawl and the principal pawl drops away from the main ratchet of the retractor.

This retractor is operable in single, dual, tandem or dual retractor installations since it acts against a lever in accord with the monitoring of withdrawal and retraction to selected points and upon energizing the lock, only a pilot pawl (free of lock stresses) is engaged. The invention thus encompasses a piloted mode selection structure for seat belt retractors wherein a specific interval of withdrawal movement of the spool activates the automatic lock mode in a pilot pawl lock structure and thereafter the vehicle sensitive lock mode is restored by selected rewind or retraction movement of the spool.

SPECIFIC DESCRIPTION

Referring to the drawings and with first specific reference to the FIG. 1, a seat belt retractor 11 with lock mode selection construction is shown. It will be understood that the retractor 11 is of the vehicle sensitive lock mode type in which a pendulum or other inertially responsive structure of well known mechanical, electrical, hydraulic and pneumatic means may be used. The activator arm 12 is visible and will be understood to be operably movable by inertial sensing means located remotely from the retractor 11 as, for example, fixed in a portion of the frame 13 (not shown) to occupy a normally vertical position as where pendulum, weight, stem and cap are on a common vertical axis in some bracket or support. This is common in automotive installations where clearance or location requires that the retractors 11 be canted away from any regular relationship to the sensing structure.

The actuator arm 12 can pivot to displace the pilot pawl element 14 by engagement against the eccentric extension 15 of the pawl 14. As will be seen, such action moves the pawl 14 toward and away from the pilot ratchet 16. At engagement of the pilot pawl 14 to the teeth 17 of the pilot ratchet 16, the pilot pawl 14 allows free movement of the pilot ratchet 16 when the retractor 11 is retracting webbing but locks against the teeth 17 when webbing 18 is being withdrawn from the retractor 11. The webbing 18 is wound on a spool 19 which is journalled for rotation between the upstanding spaced-apart flanges 20 of the frame 13. The spool 19 is under a spring rewind bias at all times and the rewind motor 21 inside the motor housing 22 is a coiled flat spring anchored at one end to the frame 13 and at the other end it is operably connected to the shaft 23 of the spool 19 in a manner well known in the art. The spacer bar 24 rigidifies the frame 13 and establishes the space interval between the flanges 20 of the frame 13. The outer end of the webbing 18 is connected to safety belt hardware shown as a tongue piece 25 connectable in a buckle element or receptacle, not shown.

The spool 19 includes one or more ratchet flanges 26 and these (two are shown) are regarded as the principal or lock ratchets with teeth 27 lockably engageable by the principal pawl or pawl bar 28. The pawl bar 28 is pivotal in the frame 13 at openings provided in the frame flanges 20. In retraction movement, the spool 19 and the axially connected ratchets 26 and 16 turn freely in accord with the rewind motor 21 and the teeth of the ratchets 26 and 16 displace the pawls 24 and 14, respectively.

At the end of shaft 23 opposite the drive motor 21, the shaft 23 includes a pinion gear 29 which turns with the shaft 23 as the spool 19 turns. The pinion 29 extends through the flange 20 of frame 13 and through a mounting plate 30 which forms a base plate supporting a monitor apparatus 31 comprising a gear train 32 operably meshed with the pinion 29 and incuding a contact extension 33 movable by the gear train 32 in an interference path with the generally radial extension 34 of the lever 35. The pivotal lever 35 is acted upon by a spring 36 of the flat formed type shaped (as will be seen) to assure that the lever 35 is biased in one of two directions, toward the post 37 or upward (as seen in the FIG. 1) in lifting the pilot pawl 14. The selection or positioning of the lever 35 is made by the monitored retraction and withdrawal or protraction of webbing 18 as reflected in movement of the gear train 32 and selected displacement of the lever 35. This selection, as will be seen, converts the retractor 11 from a piloted vehicle sensitive lock mode to a piloted automatic lock mode and then selectively returns the retractor 11 to the vehicle sensitive lock mode at a selected point in retraction.

Figure 2:
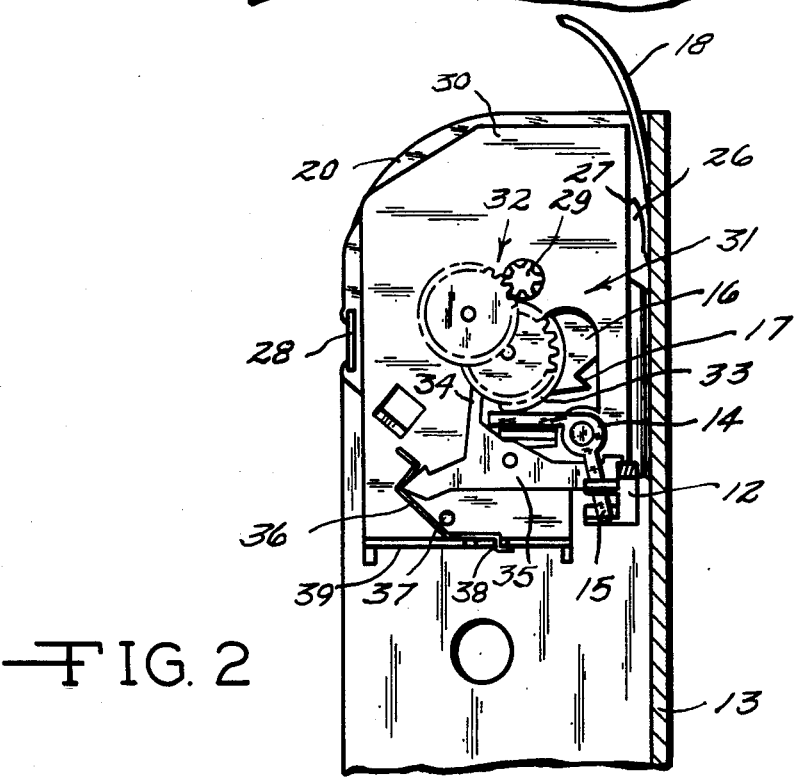
FIG. 2 is a side elevation view of the retractor and frame seen in FIG. 1 and showing the lever biased away from the pilot pawl and urged to that position by the cam driven by the gear train and the pilot pawl is selectively activated by the vehicle sensitive means.

In the FIG. 2 the configuration of the spring 36 is better appreciated and the spring 36 is secured by the L-shaped foot end 38 (in profile) projected through the wall 39 of the mounting plate 30. The FIG. 2 illustrates the retractor 11 under the vehicle sensitive mode of locking where inertially sensed movement, as by braking or sudden acceleration or deceleration of the vehicle in which the retractor is used, displaces the extension of the pilot pawl 14 causing vehicle sensitive locking as previously described.

In the FIG. 3 the vehicle sensitive locking mode is better illustrated and the pilot pawl 14 can be seen out-of-contact with the pilot ratchet 16 and held out-of-contact by the cam lobe or contact extension 33 of the gear 40 which monitors the withdrawal of webbing from the spool 19 as the shaft 23 and pinion 29 move with retraction and protraction. The pinion turns the change gear 41 and the integral change pinion 42 is also rotated. The change pinion 42 meshes with and turns the gear 40 and its contact extension 33. In the FIG. 3 the extension 33 blocks movement of the pilot pawl 14 and is regarded as the stowed or shipping position. As seen in FIG. 3A, the eccentric extension 15 of the pilot pawl 14 can be displaced by the inertial sensing actuator arm 12 and pivoting the pilot pawl 14 into blocking interference engagement with the teeth 17 of the pilot ratchet 16. In such action the pawl bar or principal pawl 28 remains unmoved until the spool 19 extends or protracts webbing. Then the pilot ratchet 16 turns and the principal ratchets 26 turn correspondingly, the teeth 27 then engaging the lock bar 28 lifted by the lift of the pilot pawl 14 applied by the lost motion link floor 43 which then moves with the pilot pawl. Lost motion space 44 in the FIG. 3A can be contrasted with the condition of FIG. 3 as regards the pilot pawl 14. The control platform 45 of the pilot pawl 14 engages the cam or contact extension 33 of the monitor gear 40 and the platform 45 extends transversely from the principal plane of the pilot pawl 14.

The FIG. 4 indicates unlock restoration of the pilot pawl 14 and lock bar 28 as retraction occurs in the spool 19 and the ramp portions of the teeth 17 and 27, respectively, tilt the pilot and principal pawls, respectively, to the normal rest position of the retractor 11 and under the vehicle sensitive lock mode. In this FIG. 4, the connective bridge 46 supporting the platform 45 of the pilot pawl 14 has been cut away as indicated.

In FIG. 5 the gear train monitor apparatus 31 functioning from the rotation of the pinion 29 on the shaft 23 of spool 19 (by reason of withdrawal of webbing 18) has achieved that point where the radial extension 34 on the pivotal lever 35 is engaged by the contact extension 47 of the monitoring apparatus 31 and the lever 35 has been moved on its pivot 48 past the centerpoint of the spring 36 and the lever 35 is thus biased toward the pilot pawl 14 and resiliently urges the pilot pawl 14 against the teeth of pilot ratchet 16. Since the pilot ratchet 16 is attached to the spool 19 and moves with the withdrawal of the webbing 18, the rotation of retractor 11 is blocked by the pilot pawl 14 and the pilot pawl 14 is rotated by the withdrawal force and power-lifts the pawl bar 28 into blocking relation against the principal ratchet flanges 26 and the teeth 27 thereof. This stops the further withdrawal of webbing 18 and the lock function mode is then automatic and remains so until the vehicle sensitive mode is restored, as will be seen. Retraction movement of the spool 19 is possible since the ratchets 16 and 26 under retraction movement act to free themselves from the pawls 14 and 28, respectively, by ramping the teeth of the ratchets against the pawls 14 and 28 and against the resilient bias of the spring 36 against the pilot pawl 14. This automatic mode persists so long as the spring 36 occupies the position seen in the FIG. 5. The inertial vehicle sensitive mode is rendered ineffective and the automatic lock mode prevails. It will be appreciated that at a selected point in retraction the monitoring gear 40 rotates to displace the pilot pawl 14 by engagement with the contact extension 47 on the gear 40 against arm 34 of lever 35 and this action forces the lever 35 over the center point 49 on the spring 36 and the retractor 11 is thereafter in the vehicle sensitive lock mode until selected withdrawal of webbing 18 restores the automatic lock mode.

As a practical matter, the point of shifting to the automatic lock mode is set on the monitoring apparatus 31 to function when webbing beyond the normal use requirements has been withdrawn. Restoration of the vehicle sensitive mode is set on the monitoring apparatus 31 when substantial retraction has occurred beyond any contact with occupants or cargo. It will be appreciated that the described structure is functional with plural retractor spools and with so-called comfort apparatus acting on one or more of the spools.

Referring to the FIG. 6 the lock-up of the retractor 11 can be best appreciated in the automatic locking mode since the pilot pawl 14 was biased into contact with the pilot ratchet 16 and upon withdrawal of webbing in the direction of the force arrow causing rotation of the ratchets 16 and 26, the ratchet 16 lifts the pawl element 14 and the pawl 14 lifts the pawl bar 28 and upon engagement with the ratchet 26, the motion is stopped. The condition at lock-up is illustrated.

In FIG. 5A the force arrow indicates that the ratchets 16 and 26 are moving in a webbing retraction direction. As the retraction movement commences, the grip of the ratchet 26 on the pawl bar 28 is relaxed and the pawl bar 28 drops away to the floor 43 of the lost motion space or slot 44 in the pawl element 14. As will be appreciated, the spring 36, by means of the lever 35, applies a continuing resilient pressure against the pilot pawl 14 urging it into contact with the pilot ratchet 16. As retraction occurs, however, the ratchet 16, by means of its ramped teeth 17, pushes the pilot pawl 14 off, repetitively, until either the retraction restores the vehicle sensitive locking mode or until the webbing 18 is withdrawn while the condition of FIG. 5 persists and the automatic mode is effective. The bridge 46 connects the pilot pawl 14 to the extension 15 for remote activation as by vehicle sensitive means not shown.

In construction of the retractors 11, the gearing, the pilot pawl 14, pilot ratchet 16 and lever 35, as well as the elements 15, may be prepared by well known dimensionally precise injection molding techniques with high accuracy and low weight using selected dimensionally stable plastic material and thereby minimizing cost and extended manufacturing and assembly procedures. The lock-up forces are isolated from direct impact on the plastic parts.

Having thus described my invention and with particularity the preferred embodiment thereof, it will be readily appreciated to those skilled in the art that improvements, modifications and changes are likely to occur and that such improvements, modifications and changes are intended to be included hereunder, limited only by the scope of my hereinafter appended claims.

I claim:

1. A seat belt retractor for a vehicle including:
   a rotatable drum on which seat belt webbing is wound,
   first ratchet means secured to and rotatable with said drum,
   first pawl means movable into engagement with said first ratchet means to lock said first ratchet means and thereby said drum against rotation in the direction of withdrawal of said seat belt webbing,
   second ratchet means secured to and rotatable with said drum,
   second pawl means movable into engagement with said second ratchet means and movable by said second ratchet means upon engagement therewith,
   said second pawl means having means cooperating with said first pawl means to effect movement of said first pawl means into engagement with said first ratchet means upon movement of said second pawl means by said second ratchet means, and
   means for moving said second pawl means into engagement with said second ratchet means upon withdrawal of said seat belt webbing in excess of a predetermined amount, said means for moving said second pawl means comprising lever means for moving said second pawl means into engagement with said second ratchet means and sensing means for sensing withdrawal of said seat belt webbing and for actuating said lever means upon withdrawal of said seat belt webbing in excess of said predetermined amount.

2. A seat belt retractor as set forth in claim 1 including actuator means for moving said second pawl means into engagement with said second ratchet means and inertia responsive means for effecting actuation of said actuator means in response to a sudden deceleration of the vehicle to move said second pawl means into engagement with said second ratchet means.

3. A seat belt retractor as set forth in claim 1 further including spring means acting on said lever means, said lever means having a first position in which said lever means is spaced from said second pawl means and a second position in which said lever means engages said second pawl means, said spring means biasing said lever means away from said second pawl means when said lever means is in said first position and biasing said lever means into engagement with said second pawl means when said lever means is in said second position.

4. A seat belt retractor as set forth in claim 3 wherein said sensing means comprises a cam member rotatable in response to rotation of said drum for moving said lever means from said first position into said second position upon withdrawal of said seat belt webbing in excess of said predetermined amount and drive means for rotating said cam member upon rotation of said drum.

5. A seat belt retractor as set forth in claim 1 wherein said cam member includes a camming portion thereon for moving said lever means from said first position into said second position upon withdrawal of said seat belt webbing in excess of said predetermined amount and for moving said lever means from said second position into said first position upon retraction of said seat belt webbing another predetermined amount.

6. A seat belt retractor as set forth in claim 5 wherein said spring means having a peak point, said spring means having a first portion biasing said lever means away from said second pawl means when said lever means is on one side of said peak point and said spring means having a second portion biasing said lever means into engagement with said second pawl means when said lever means is on the other side of said peak point, said lever means including a projection thereon engageable by said camming portion for moving said lever means from the one side of said peak point to the other side of said peak point.

7. A seat belt retractor as set forth in claim 6 including means for supporting said lever means for pivotal movement between said first and second positions, and said camming portion pivoting said lever means between said first and second positions upon engagement with said projection on said lever means.

* * * * *